(12) United States Patent
Hjertberg

(10) Patent No.: US 12,372,327 B2
(45) Date of Patent: Jul. 29, 2025

(54) ACCESSORY MOUNTING SYSTEM AND METHOD OF USING THE SAME

(71) Applicant: 3M INNOVATIVE PROPERTIES COMPANY, St. Paul, MN (US)

(72) Inventor: Tim S. Hjertberg, Jönköping (SE)

(73) Assignee: 3M Innovative Properties Company, St. Paul, MN (US)

( * ) Notice: Subject to any disclaimer, the term of this patent is extended or adjusted under 35 U.S.C. 154(b) by 201 days.

(21) Appl. No.: 17/621,417

(22) PCT Filed: Jun. 23, 2020

(86) PCT No.: PCT/IB2020/055913
§ 371 (c)(1),
(2) Date: Dec. 21, 2021

(87) PCT Pub. No.: WO2020/261111
PCT Pub. Date: Dec. 30, 2020

(65) Prior Publication Data
US 2022/0357126 A1    Nov. 10, 2022

Related U.S. Application Data

(60) Provisional application No. 62/868,363, filed on Jun. 28, 2019.

(51) Int. Cl.
*F41C 27/00*    (2006.01)
*F16B 2/02*    (2006.01)
*F41G 11/00*    (2006.01)

(52) U.S. Cl.
CPC ................ *F41C 27/00* (2013.01); *F16B 2/02* (2013.01); *F16B 2200/30* (2018.08); *F41G 11/003* (2013.01)

(58) Field of Classification Search
CPC .. A42B 3/00–328; F16B 2/02; F16B 2200/30; F41C 27/00; F41G 11/003;
(Continued)

(56) References Cited

U.S. PATENT DOCUMENTS 2,526,126 A * 10/1950 Gagnier ................ F41G 11/003
42/127
3,405,448 A * 10/1968 Weatherby ............ F41G 11/003
42/127
(Continued)

FOREIGN PATENT DOCUMENTS

CN      2605134 Y    3/2004
DE    102006024508    11/2007

OTHER PUBLICATIONS

International Search report for PCT International Application No. PCT/IB2020/055913 mailed on Sep. 21, 2020, 5 pages.

*Primary Examiner* — Josh Skroupa

(57) ABSTRACT

An accessory attachment system is presented. The accessory attachment system includes a mounting rail. The mounting rail has a plurality of protrusion and recesses. The protrusions and recesses alternate in a repeating pattern along the mounting rail. The accessory attachment system also includes an accessory configured to be mounted on the mounting rail. The accessory attachment system also includes a friction plate configured to hold the accessory in a position on the mounting rail. The friction plate comprises friction feature configured to interact with the plurality of protrusions and recesses to create a friction force that holds the accessory in the position. The accessory attachment system allows for movement of the accessory along the rail with an application of force. The applied force is greater than the friction force.

17 Claims, 11 Drawing Sheets

(58) Field of Classification Search
CPC ..... Y10T 403/32229; Y10T 403/32451; Y10T 403/599; Y10T 403/60; Y10T 403/606; Y10T 403/7094
USPC .................. 403/80, 107, 325, 326, 329, 381
See application file for complete search history.

(56) References Cited

U.S. PATENT DOCUMENTS

| | | | |
|---|---|---|---|
| 6,773,172 B1* | 8/2004 | Johnson | F16M 13/00 396/428 |
| 7,272,904 B2 | 9/2007 | Larue | |
| 7,523,583 B2* | 4/2009 | Cheng | F41G 11/003 42/114 |
| 7,975,419 B2* | 7/2011 | Darian | F41G 11/003 42/84 |
| 8,196,332 B2* | 6/2012 | Brentzel | F41G 11/003 42/124 |
| 8,800,194 B2* | 8/2014 | Teetzel | F41G 11/003 42/124 |
| 8,813,412 B2* | 8/2014 | Rorick | F41G 11/003 42/124 |
| 8,898,949 B1* | 12/2014 | Greenwood | F41G 11/003 42/124 |
| 10,132,596 B2* | 11/2018 | Bartoszewicz | F41G 11/003 |
| 10,299,528 B2* | 5/2019 | Dextraze | A42B 3/04 |
| 10,317,174 B2* | 6/2019 | Samson | F41G 11/004 |
| 11,029,131 B2* | 6/2021 | Cahill | F41G 11/003 |
| 11,262,167 B2* | 3/2022 | Ding | F41G 11/003 |
| 2008/0040965 A1 | 2/2008 | Solinsky | |
| 2012/0085013 A1* | 4/2012 | Cahill | F41G 11/003 42/96 |
| 2013/0061506 A1 | 3/2013 | Atkinson | |
| 2015/0068094 A1* | 3/2015 | Seuk | F41G 11/003 42/90 |

\* cited by examiner

ACCESSORY MOUNTING SYSTEM AND METHOD OF USING THE SAME

CROSS REFERENCE TO RELATED APPLICATIONS

This application is a national stage filing under 35 U.S.C. 371 of PCT/IB2020/055913, filed Jun. 23, 2020, which claims the benefit of U.S. Provisional Application No. 62/868,363, filed Jun. 28, 2019, the disclosure of which is incorporated by reference in its/their entirety herein.

BACKGROUND

Personal protective equipment (PPE) is utilized, e.g., in military and police applications and has been developed that support one or more accessories such as flashlights or cameras. These accessories can assist the wearer in performing various tasks. For example, flashlights can be utilized to allow the wearer to more easily see the immediate surroundings. Frequently, the position of the flashlight or other accessory may need to be adjusted, or the accessory may need to be removed and replaced with another accessory. Further, two or more accessories may need to be utilized concurrently. When no accessories are required, the weight of the PPE (E.g. headgear, belts, backpacks, etc.) can be reduced by removing such accessories.

To more easily attach and remove accessories, various mounting systems have been developed. Such systems often include a rail or groove within which a mount attached to an accessory can be disposed. The rail can allow a wearer to adjust the accessory relative to the head gear. Such rails, however, can require the wearer use one or more tools to reposition the accessory. Further, at least some of these rails do not allow a wearer to reposition the accessory with a single hand, oftentimes requiring that the user remove the PPE to adjust the accessory.

SUMMARY

An accessory attachment system is presented. The accessory attachment system includes a mounting rail. The mounting rail has a plurality of protrusion and recesses. The protrusions and recesses alternate in a repeating pattern along the mounting rail. The accessory attachment system also includes an accessory configured to be mounted on the mounting rail. The accessory attachment system also includes a friction plate configured to hold the accessory in a position on the mounting rail. The friction plate comprises a friction feature configured to interact with the plurality of protrusions and recesses to create a friction force that holds the accessory in the position. The accessory attachment system allows for movement of the accessory along the rail with an application of force. The applied force is greater than the friction force.

BRIEF DESCRIPTION OF THE DRAWINGS

Throughout the specification, reference is made to the appended drawings, where like reference numerals designate like elements.

DETAILED DESCRIPTION

Figure 1A:
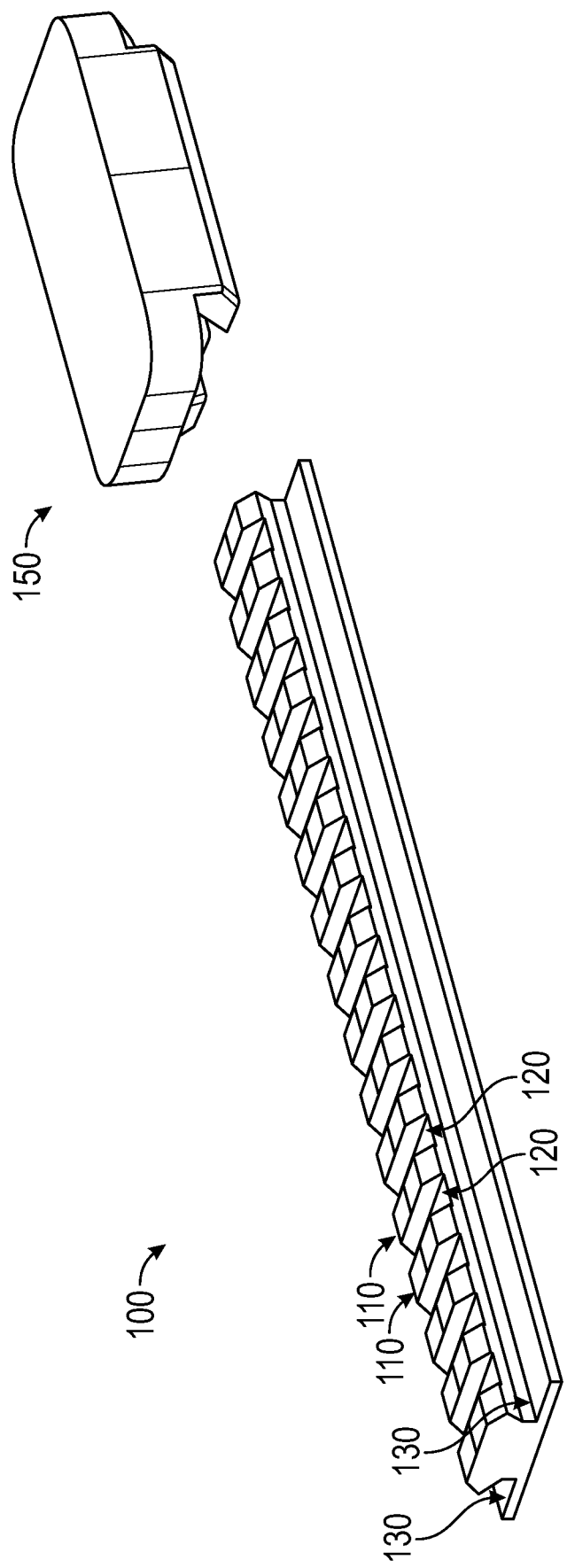
FIGS. 1A-C illustrate a rail system in which embodiments of the present invention may be useful.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

In general, a Picatinny rail, also known as a MIL-STD-1913 rail, Standardization Agreement 2324 rail, or tactical rail, is a bracket that includes a series of ridges with a T-shaped cross-section interspersed with flat spacing slots. Accessories can be mounted onto the rail, e.g., by sliding them on from one end or the other; by means of a Weaver mount that is clamped to the rail; or by connecting the accessory to the slots between the raised sections. Each slot can have a width of 0.206 in (5.23 mm). Further, the slots can have a center-to-center spacing of 0.394 in (10.01 mm), and a slot depth of 0.118 in (3.00 mm). See MIL-STD-1913 (1995), "Dimensioning of Accessory Mounting Rail for Small Arms Weapons." Further, one or more embodiments of accessory mounting devices described herein can allow connection of standard devices and accessories that are connected to Picatinny mounts to be attached to an accessory rail on a combat helmet or other type of head gear. Any suitable accessories can be connected to a rail utilizing one or more embodiments of accessory mounting devices described herein, e.g., flashlights, cameras, gun sights, night vision goggles, protective face shields, etc.

In general, the present disclosure provides various embodiments of an accessory mounting device for a rail system and a system utilizing such device. In one or more embodiments, the device can be used to attach an accessory to an elongated rail. While a Picatinny rail system is discussed in detail, and illustrated in the figures as one example of a rail system. However, it is expressly contemplated that systems and methods described herein may be used with other rail systems such as a Weaver rail, a Warsaw rail, a STANAG rail, or any other suitable rail system. Embodiments suitable for such other rail systems are expressly contemplated herein.

One or more embodiments of accessory mounting devices described herein can connect one or more accessories to an accessory rail system. Further, one or more embodiments of accessory mounting devices described herein can allow a wearer to mount one or more accessories to an accessory or elongated rail without the use of one or more tools such as a screwdriver or wrench.

Figure 1B:
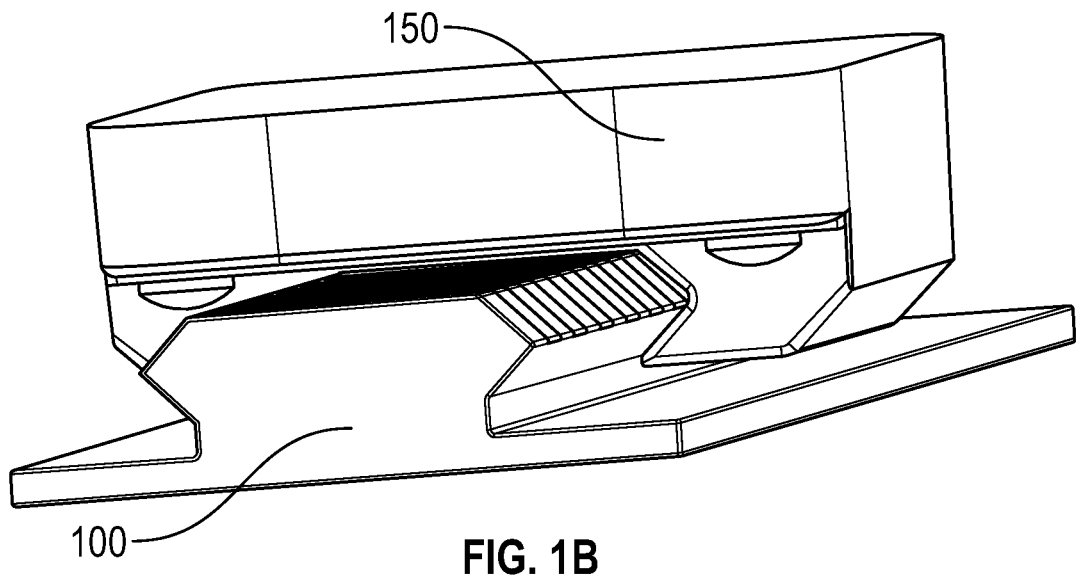
Figure 1C:
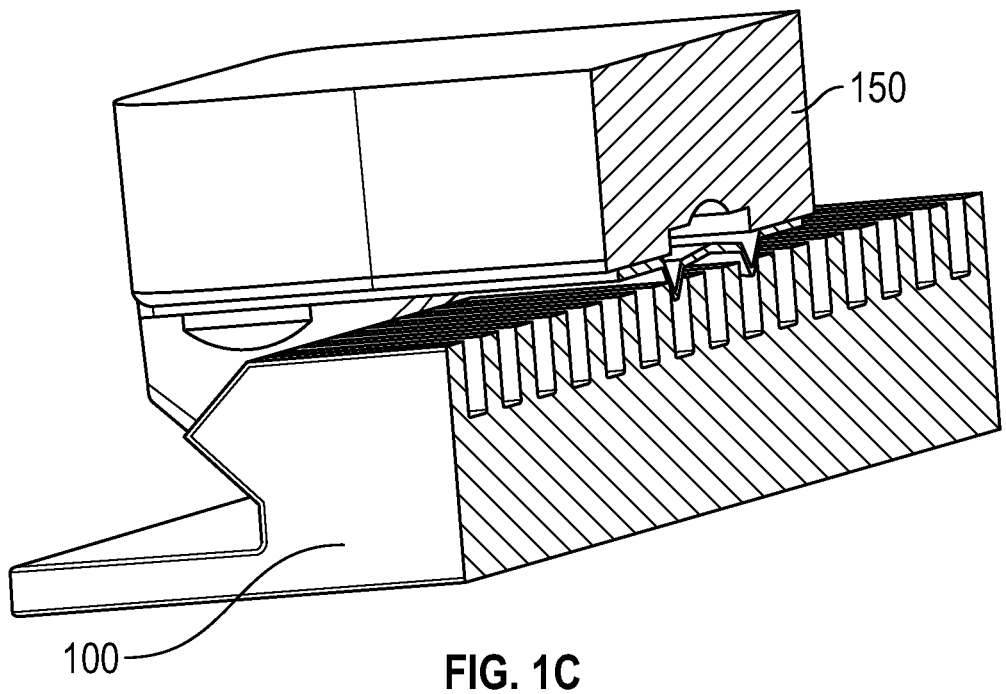

FIGS. 1A-C illustrate a rail system in which embodiments of the present invention may be useful. FIG. 1A illustrates a rail 100 and an accessory 150 for attachment to rail 100. FIG. 1B illustrates an accessory 150 interacting with rail 100 and FIG. 1C illustrates a cutaway view the interaction in FIG. 1B. Rail 100 can be a variety of lengths, but a traditional Picatinny rail 100 includes alternating protrusions 110 and recesses 120 of regular sizes. Rail 100 also has indentations 130 that traditionally are used for attachment. As illustrated in FIGS. 1B and 1C, accessories 150 are often sized to interact with rail indentations 130.

In currently available Picatinny rail system designs, a user may be required to use a tool to release an accessory from the rail. This requires a user to carry the necessary tools and fixtures to mount and unmount accessories from the rail. Since such rail systems can be used by military or police personnel in situations where small equipment can be lost and large equipment bulky, it is desired to have a system that can toollessly attach and remove an accessory from a rail system. At least some embodiments described herein can allow a wearer to attach and detach an accessory to a rail system using a single hand, without additional tools or fixing mechanisms.

Figure 2:
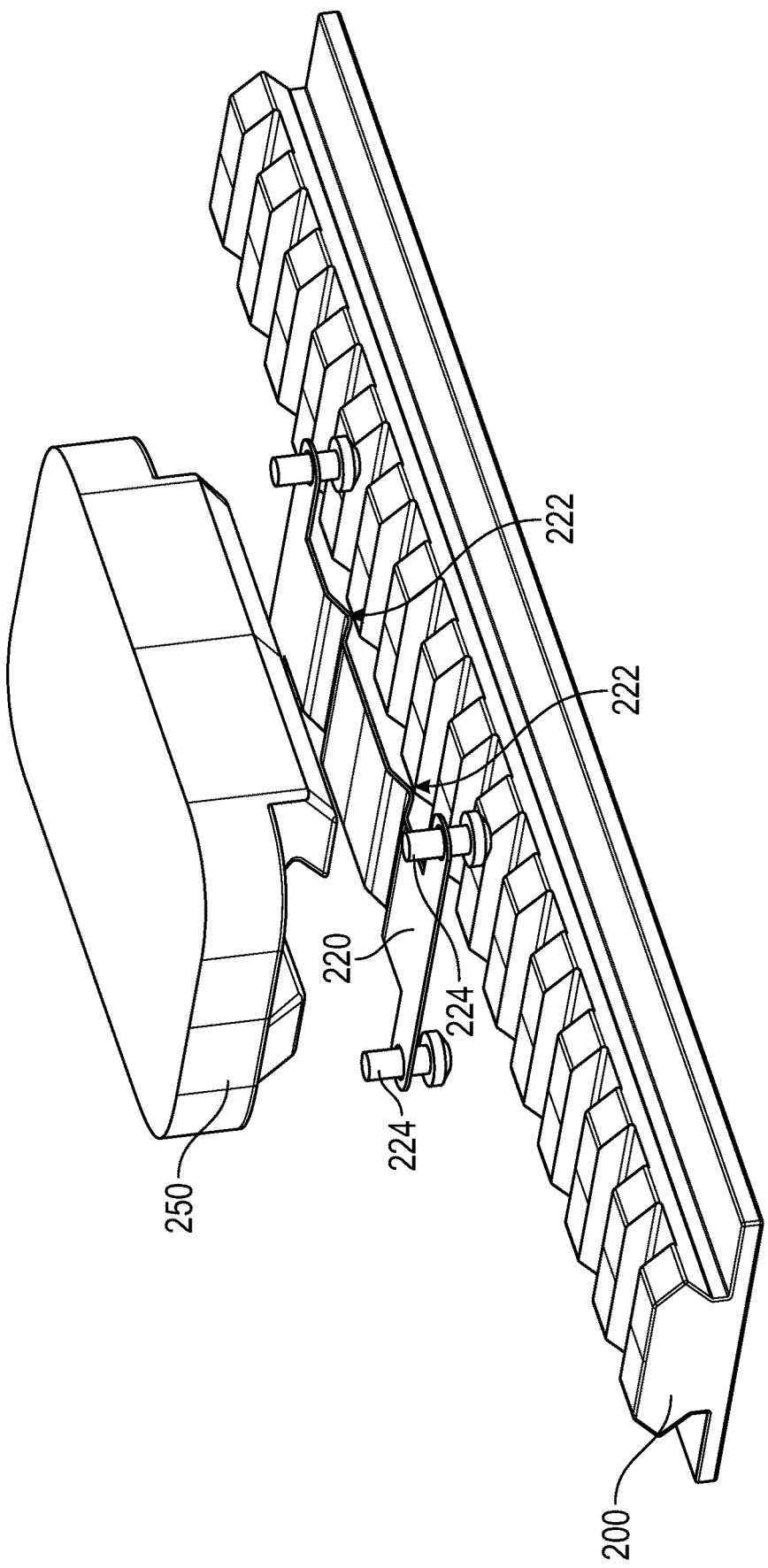
FIG. 2 illustrates an accessory attachment mechanism for a rail system in accordance with an embodiment of the present invention.

FIG. 2 illustrates an accessory attachment mechanism for a rail system in accordance with an embodiment of the present invention. Accessory 250 can attach to rail 200 using a friction plate 220. Friction plate 220 has one or more friction features 222 configured to interact with the protrusions and recesses. As illustrated in FIG. 2, a friction feature 222, in one embodiment, is an angled indentation within plate 220. Friction features 222 are spaced to fit within recesses of rail 200. Friction features 222 allow friction plate 230 to respond to applied force such that accessory 250 can move in either direction along rail 200. Friction features 222 are shaped to allow accessory 250 to 'snap' into a position on rail 200 without being locked into place. Instead, a user can adjust the position of accessory 250 along rail 200 by applying a force.

In one embodiment, friction plate 220 is fixed to accessory 250 through fixing features 224. Fixing features 224, as indicated in FIG. 2, include one or more mechanical features configured to couple friction plate 220 to accessory 250 such that friction features 222 are free to move and engage rail 220. As illustrated in FIG. 2, in one embodiment, friction features 222 include screws or bolts located at each corner of friction plate 220. However, more or fewer fixing features 224 may be used. Fewer fixing features 224 may allow for friction plate 220 to move more easily along rail 200, allowing a user to move accessory 250 up and down rail 200 with less force.

Figure 3A:
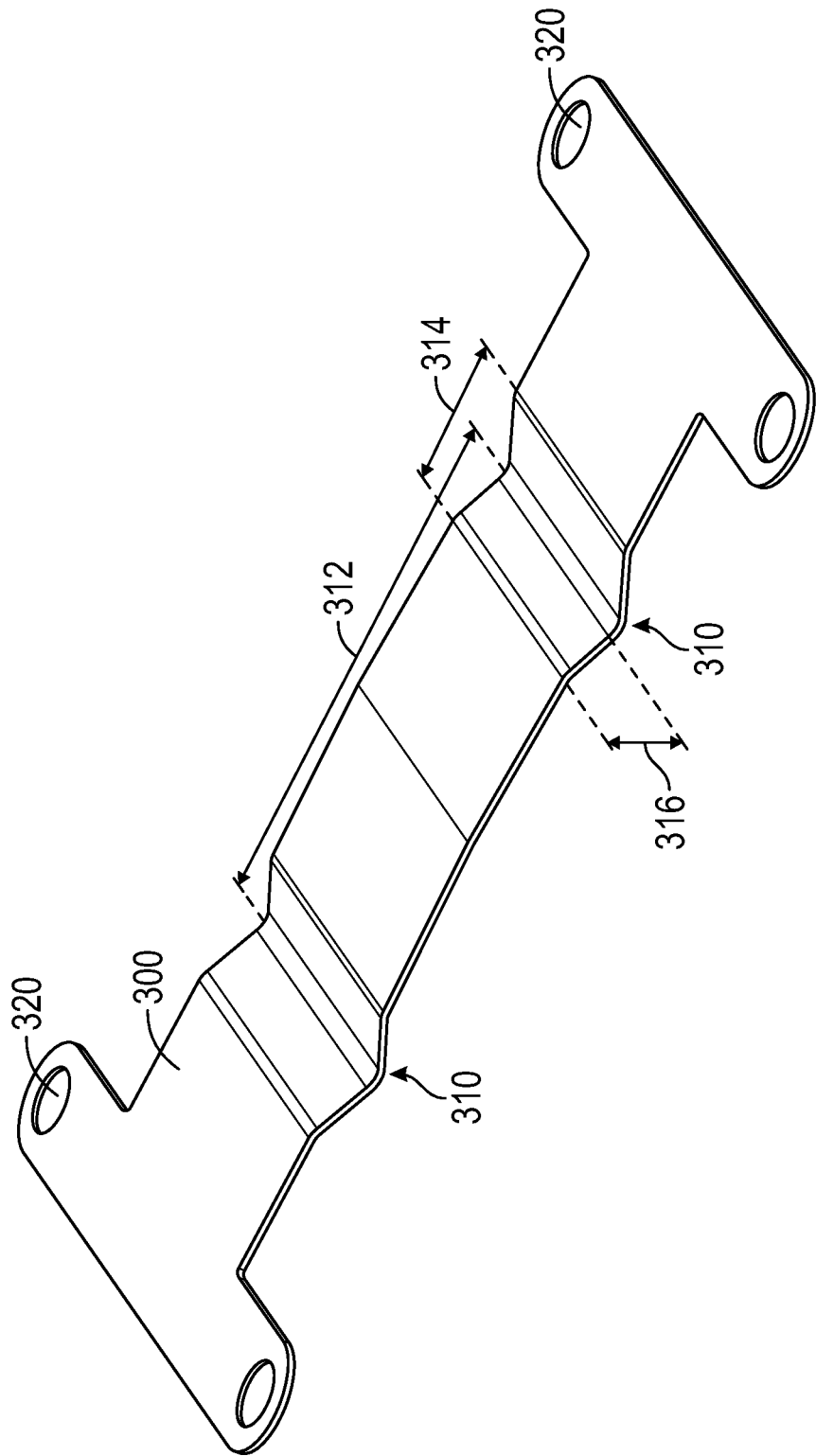
FIGS. 3A-3C illustrate a friction plate in accordance with an embodiment of the present invention.
Figure 3B:
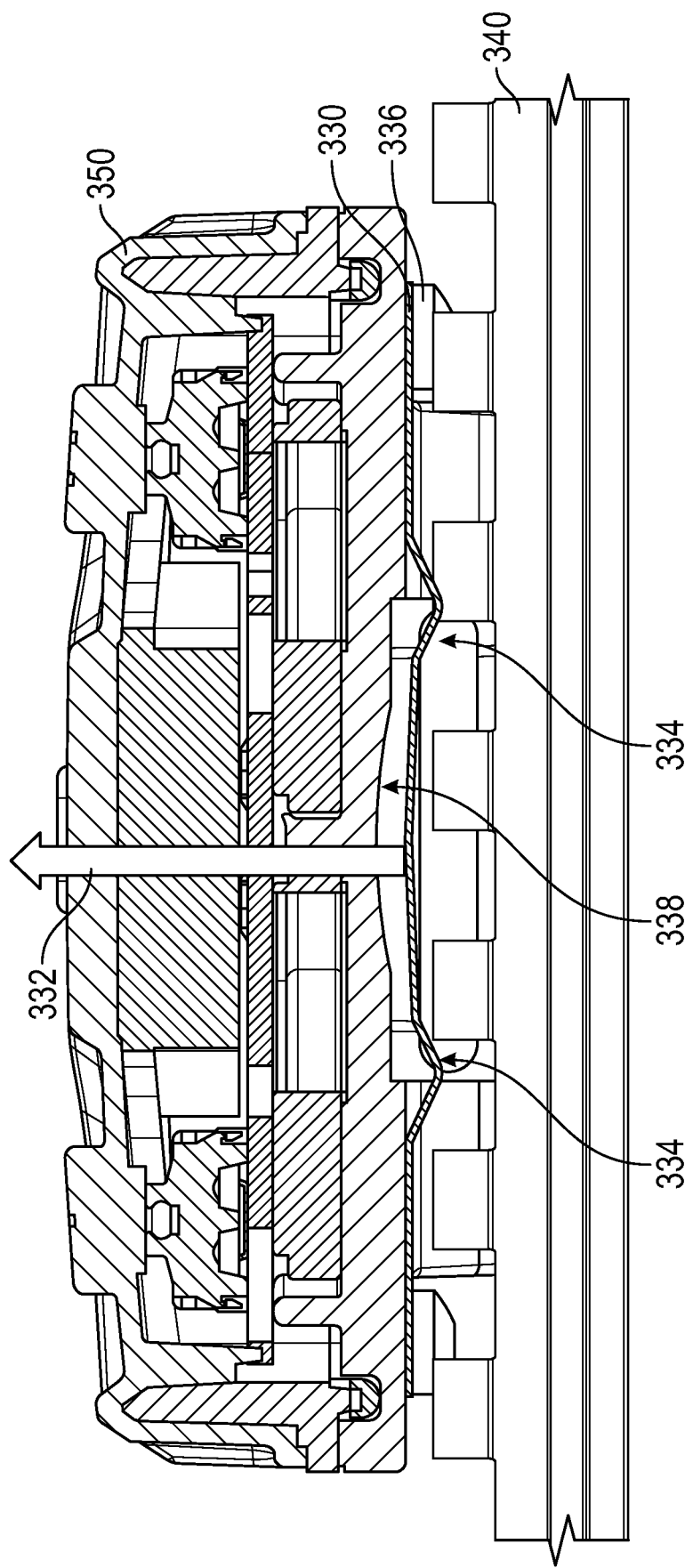
Figure 3C:
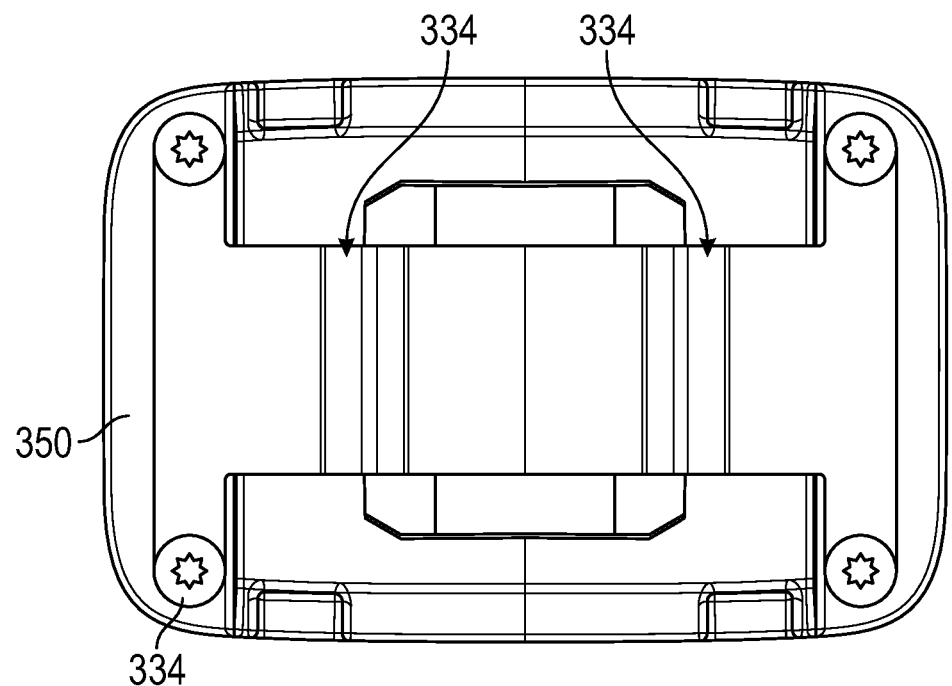

FIGS. 3A-3C illustrate a friction plate in accordance with an embodiment of the present invention. Friction plate 300, in the embodiment illustrated in FIG. 3A, is a substantially planar plate 300 with two friction features 310. As illustrated in FIG. 3B, friction features 310 are sized to interact with protrusions on a rail 340. The exact size and shape of friction plate 300 will depend on the rail accessory 350 is going to interact with. For example, as illustrated in FIGS. 3A-3C, a friction plate 330 is illustrated for interaction with a picatinny rail 340. A friction plate 330 designed for interaction with a weaver rail, for example, will be shaped differently based on the standard sizing of protrusions and recesses for weaver rails.

The embodiment illustrated in FIG. 3A is a friction plate 300 for a picatinny rail system. Friction plate 300 has two friction features 310, spaced apart by a friction feature distance 312. Each friction feature 310 also has width 314 and a depth 316. However, while friction plate 300 illustrates two friction features 310, it is expressly contemplated that more, or fewer, friction features 310 may be present. For example, additional friction features 310 may increase the amount of friction force that must be overcome to move an accessory along a rail. This may be helpful for an accessory that is heavy, ensuring that it does not move along the rail with the force of gravity alone. Additionally, while both friction features 310 illustrated in FIG. 3A are characterized by the same width 314 and depth 316, it is also expressly contemplated that different friction features may be characterized by different parameters, e.g. one may have a greater width or depth than another. Further, while friction features 310 are illustrated as having a "V" shape, other shapes are also expressly contemplated. For example, a "U" shaped curve may also work. The shape of the friction feature can also alter the feeling of the accessory moving along the rail. For example, it may alter whether movement feels smooth or whether a 'snap' characteristic is present as the features interact with each subsequent rail feature. FIG. 3A also illustrates a symmetrical friction plate 330. However, other non-symmetrical designs are also contemplated herein.

FIG. 3B illustrates friction plate 330 coupling an accessory 350 to a rail 340. Friction features 334 interact with rail protrusions, forcing friction plate 330 to deflect along deflection direction 332.

FIG. 3C illustrates a bottom view of an accessory 350 coupled to friction plate 330. Accessory 350 is shaped to interact with rail 340. However, the use of friction plate 330 also creates the possibility of accessories not manufactured for use with a rail system to be modified. For example, friction plate 330 can couple to an intermediate module, shaped to interact with a rail (e.g. shaped to interact with rail indentations 130, discussed with respect to FIG. 1A), which is then connected to an accessory 350.

Figure 4:
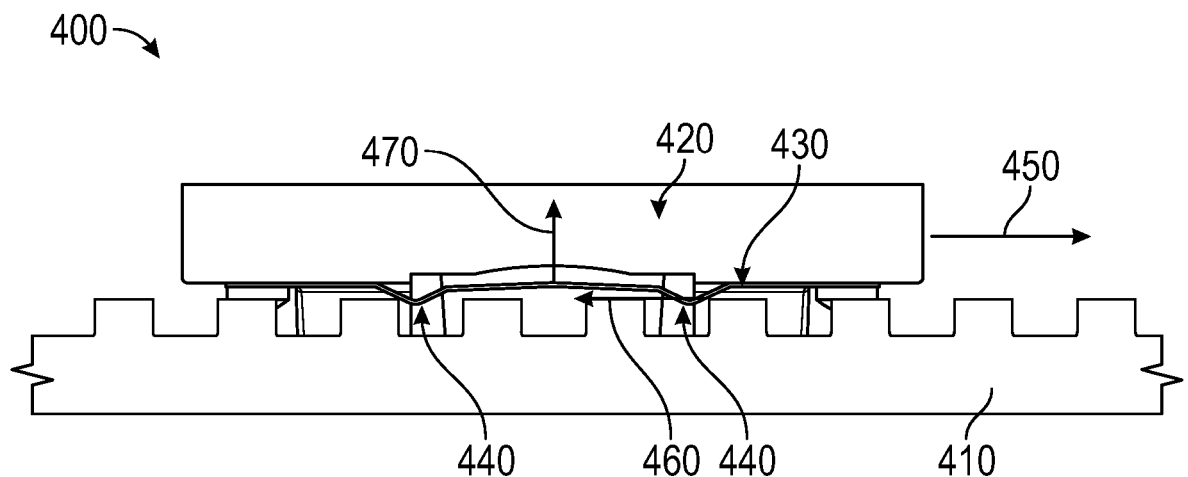
FIG. 4 illustrates an accessory attachment system in accordance with an embodiment of the present invention.

FIG. 4 illustrates an accessory attachment system in accordance with an embodiment of the present invention. Accessory attachment system 400 includes a rail 410 to which an accessory 420 is coupled using a friction plate 430. Friction plate 430 allows for accessory 420 to attach to rail 410 without the use of additional tools or fixing mechanisms. When coupled, friction plate 430 deflects along deflection direction 470.

Accessory 420 can be removed, or moved, along rail 410, through the application of force along direction 450. If applied force 450 is greater than a friction force 460, accessory 420 will move along rail 410. The ability to dynamically change the position of accessory 420, without the need for additional tools, and with only the application of force to accessory 420, provides an improved ease of use that has not been present in previous accessory attachment systems. While movement in direction 450 is illustrated in FIG. 4, it is also contemplated that movement in the opposing direction is also possible, by applying force in the opposite direction.

Friction force 460 is provided by the interaction of friction features 440 with protrusions and recesses of rail 410. The interaction also causes deflection along direction 470.

Figure 5A:
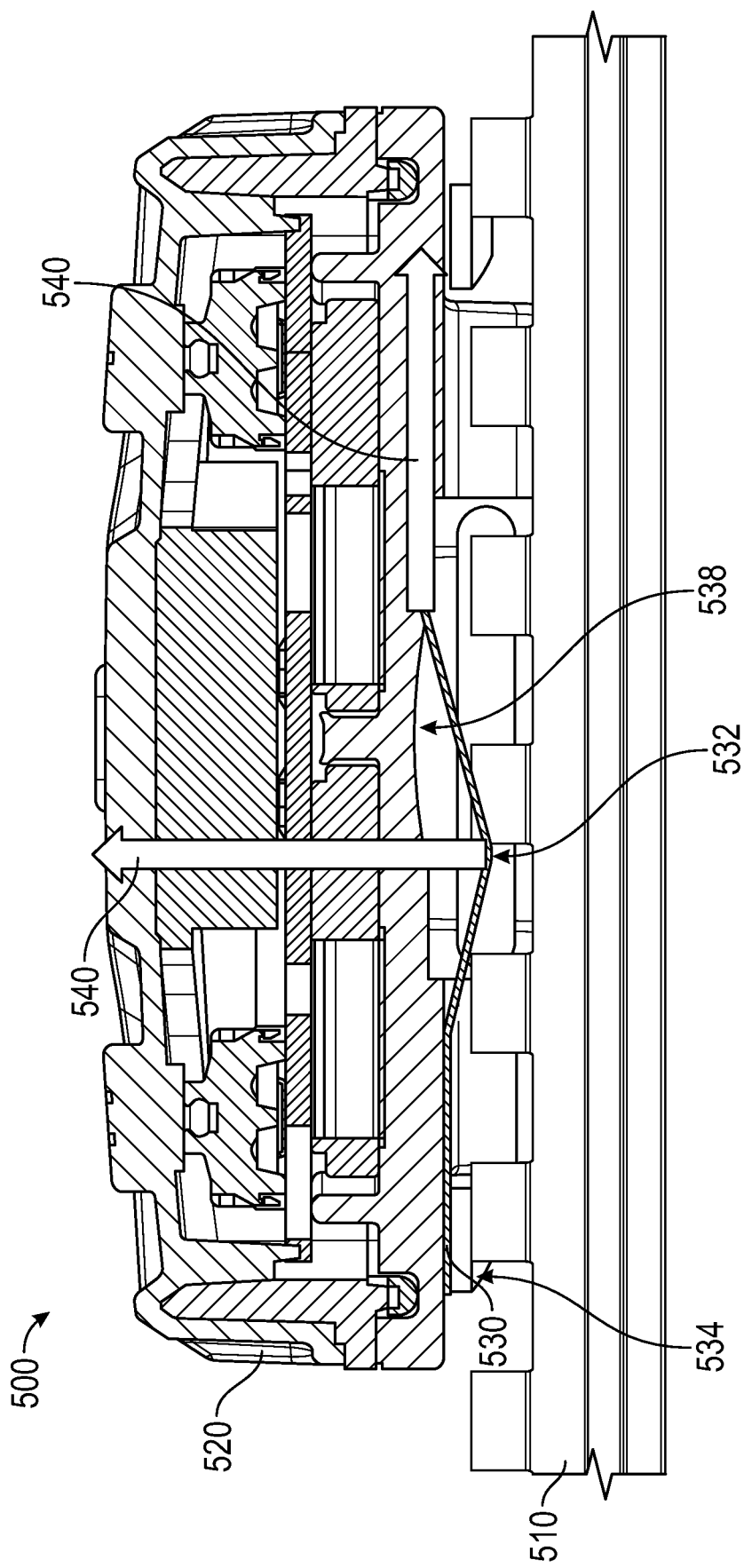
FIGS. 5A-5C illustrate an accessory attachment system in accordance with another embodiment of the present invention.
Figure 5B:
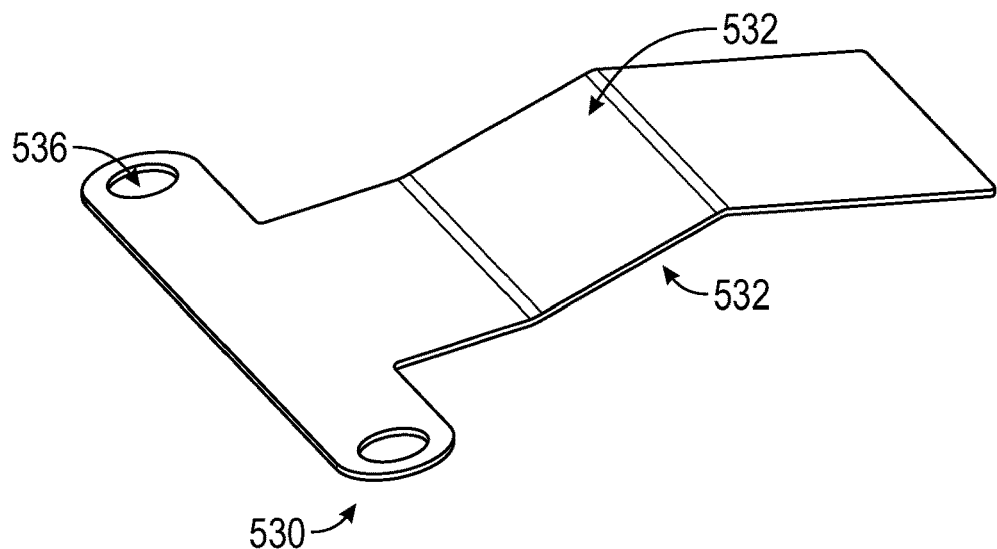
Figure 5C:
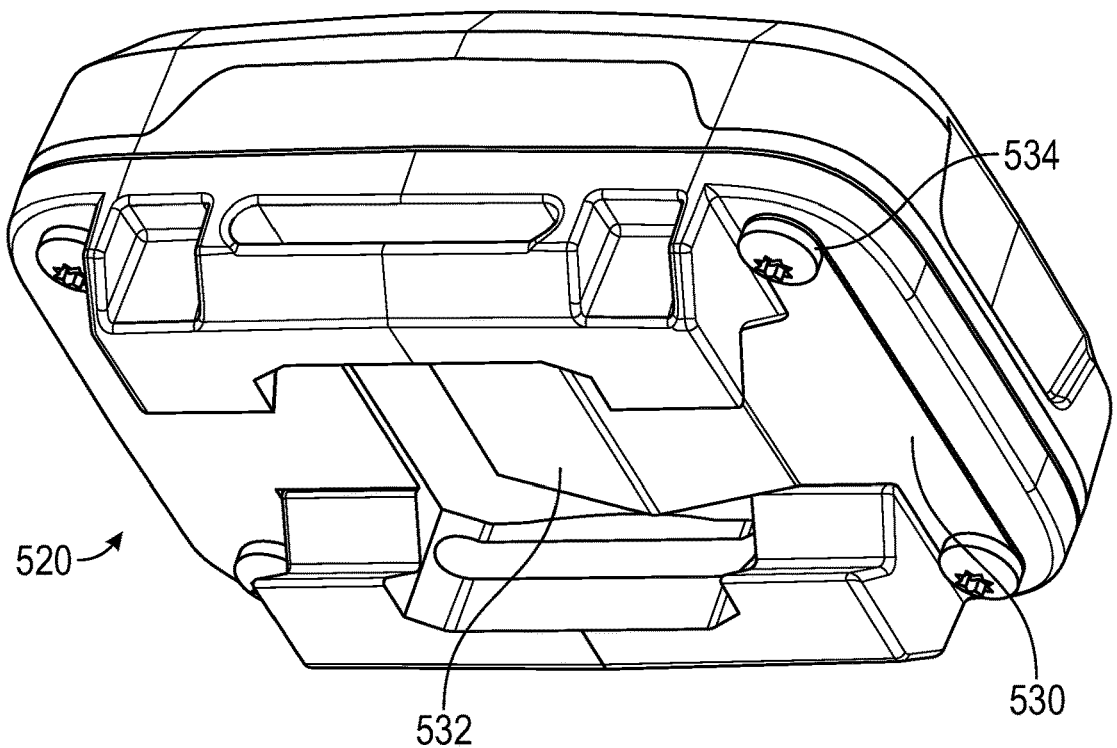

FIGS. 5A-5C illustrate an accessory attachment system in accordance with another embodiment of the present invention. Accessory attachment system 500 includes a rail 510 to which accessory 520 can attach using friction plate 530. As illustrated in FIG. 5B, friction plate 530 is an asymmetrical friction plate 530 with a friction feature 532 that allows for deformation along rail 510 and perpendicular to rail 510 as illustrated by deformation directions 540. Friction plate 530 is fixed to accessory 520 using one or more fixing mechanisms 534. The ability to deform in both directions 540 may allow for accessory 520 to move along rail 510 more easily.

The force required to move an accessory along a rail using a friction plate depends on several factors. The material used to make the friction plate can alter a friction force produced. For example, stiffer materials may require a higher applied force to cause the accessory to move along the rail. In one embodiment, the friction plate is made of steel, such as a high yield strength spring steel. In one embodiment, the friction plate is AISI 301 steel. However, other steel may also be used, in other embodiments. Other materials, such as polymer-based materials may also be used in other embodiments. The material should be flexible enough to deform and maintain a position of an accessory plate along a rail, but stiff enough to suit the intended use scenario. A thickness of a friction plate may also alter the friction force that must be overcome. For example, a thicker friction plate will be stiffer and harder to engage.

Additionally, the design of the friction features will also affect the force required to cause an accessory to move. In some embodiments it may be desired for movement of the accessory to feel smooth along the rail. In other embodiments, it may be desired that a user feel the accessory move along each protrusion of the rail. This may be achieved by altering a material or a material thickness of a friction plate. However, it can also be achieved by altering the design of the friction features. The amount of interaction between the friction features and the protrusions of a rail will affect the amount of force that a user must apply to move an accessory along the rail. A friction feature with a smaller depth will more easily move in and out of recesses on a rail. Varying the width of the friction feature will also affect the ease of moving the accessory. For example, a width that allows for a gradual slope of a friction feature will move differently than a steeper slope. The shape of the friction feature will also affect the ability to move it. For example, a U-shaped friction feature will move differently than a V-shaped feature. The amount, or lack, of curvature at the tip of a friction feature will change how the movement feels to a user, and may also alter the force required to move the accessory along the rail.

Figure 6:
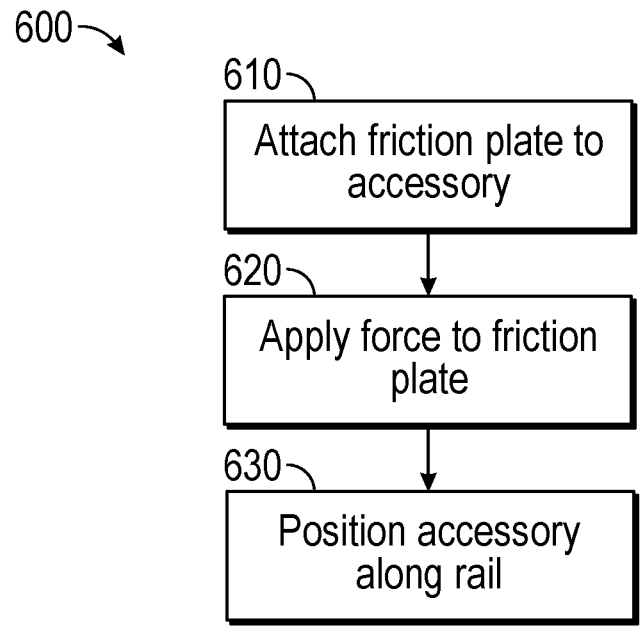
FIG. 6 illustrates a method of attaching an accessory to a rail system in accordance with an embodiment of the present invention.

FIG. 6 illustrates a method of attaching an accessory to a rail system in accordance with an embodiment of the present invention. Method 600 may be useful for attaching an accessory to a rail using a friction plate such as that described with respect to FIG. 3 or FIG. 5, or with other suitable embodiments described or contemplated herein.

In block 610, a friction plate is attached to an accessory. In one embodiment, this includes fixing a friction plate to an accessory configured for attachment to a picatinny, or other suitable rail system. However, in another embodiment, this includes attaching a friction plate to an intermediate module that couples directly to an accessory. A friction plate may be coupled to an accessory using one or more fixing mechanisms. For example, a friction plate may be coupled at one or more fixing points using one or more fixing mechanisms.

In block 620, force is applied to a friction plate. The friction plate is configured to allow movement of an accessory along an axis parallel to an axis defined by a length of the rail. In one embodiment, applying a force includes applying a force on the accessory in a direction parallel to the axis of movement. For example, force may comprise a user pushing accessory in a desired direction of travel of the accessory along the rail. Applying a force may also include the user applying a force by pushing downward on accessory, or by pulling upward on accessory, in other embodiments.

In block 630, the accessory is positioned along the rail. In one embodiment, when the force applied is greater than the friction force holding the friction plate in place, the accessory moves along the rail in the direction of the applied force. In order to position the accessory in a desired position, the applied force is removed, and the friction features will move into place in the nearest recesses along rail. The friction plate will hold the accessory in place until another force is applied.

Figure 7:
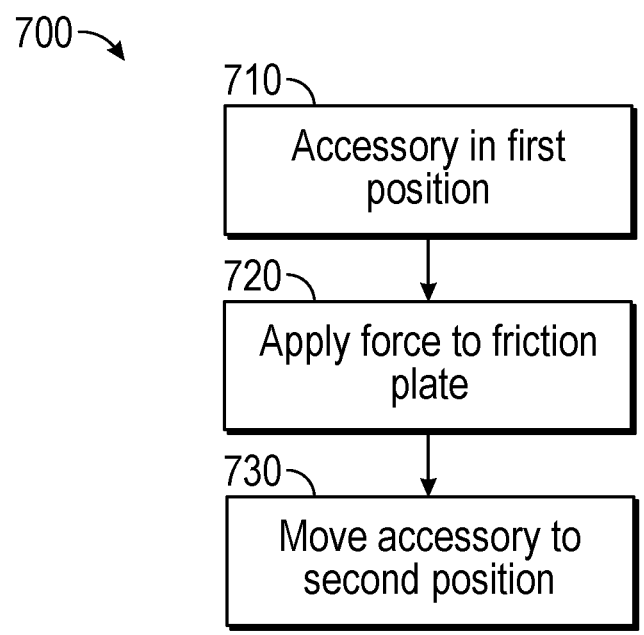
FIG. 7 illustrates a method of moving an accessory along a rail system in accordance with an embodiment of the present invention.

FIG. 7 illustrates a method of moving an accessory along a rail system in accordance with an embodiment of the present invention. Method 700 may be useful for moving an accessory along a rail using a friction plate such as that described with respect to FIG. 3 or FIG. 5, or with other suitable embodiments described or contemplated herein.

In block 710, the accessory is located in a first position on a rail system, such as a picatinny or other suitable rail system. The accessory being in a first position includes the friction features of a friction plate coupled to the accessory interacting with recesses of the rails system to hold the accessory in place.

In block 720, a force is applied to the accessory. It is notable that no additional action needs to be taken to release the accessory from a first position besides applying a force greater than the friction force generated by the friction features interacting with the recesses of a rail. Prior art attachment systems required removal of fixing mechanisms using separate tools, or releasing of snaps. However, the inclusion of a friction plate makes moving the accessory a more dynamic operation, easier for a user to accomplish more quickly.

In block 730, the accessory is moved into a second position. This involves releasing an applied force such that the friction features interact with new recesses along the rail. The friction force holding accessory in place in the second position, in one embodiment, is substantially the same as that holding the accessory in the first position.

For both methods 600 and 700, it is important that the force required to place or move the accessory be greater than a force of gravity, or other forces from which repositioning is not desired. For example, some rail systems are positioned such that they are not parallel to ground, and a gravity force acts on the accessory. For example, if a rail system is placed on a helmet, it is important that the accessory not move because a user inclines their head, causing the rail system to be at an angle with respect to the ground, and causing a gravity force to pull the accessory toward one end of the rail. It is necessary that the friction force holding accessory in place be greater than an anticipated gravity force that may act on the accessory. Additionally, the gravity force should also be considered in the event that a user wearing or using a picatinny rail system may be subjected to higher forces, for example if the user is running, jumping, or if the picatinny rail system is otherwise jostled. However, it is also important that the force required be small enough that a user can move the accessory along the rail, preferably using only one hand.

The various accessory mounting devices described herein can be utilized to attach an accessory to a helmet utilizing any suitable connection interface. For example, in one or more embodiments, the accessory mounting device can include a Picatinny rail or tactical rail that is adapted to receive a Picatinny mount connected to an accessory.

The friction plates described herein can be manufactured using any suitable technique or combination of techniques, e.g., injection molding, additive manufacturing (e.g., 3D printing such as fusion deposition modeling and stereo lithography), and subtractive manufacturing (e.g., machining). In one or more embodiments, the friction plate can be a unitary device or multiple pieces combined together.

One or more accessories can be connected to a rail system using friction plates described herein. While the figures illustrate a control unit being coupled to the rail system, other accessories are also envisioned, such as flashlights or other useful equipment.

Although depicted as including one accessory, any suitable number of accessories can be connected to a rail at the same time. In one embodiment, a friction plate is configured to attach to a single accessory. However, in another embodiment, multiple accessories may couple to a single friction plate. Additionally, while a single friction plate is shown in the figures, it is expressly contemplated that some rail systems may allow for the attachment of several accessories, each using its own friction plate.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

Additional Embodiments

The following exemplary embodiments are provided, the numbering of which is not to be construed as designating levels of importance:

Embodiment 1 is an accessory attachment system. Accessory attachment system includes a mounting rail comprising a plurality of protrusions and recesses. The protrusions and recesses alternate in a repeating pattern along the mounting rail. The accessory attachment system also includes an accessory configured to be mounted on the mounting rail. The accessory attachment system also includes a friction plate configured to hold the accessory in a position on the mounting rail. The friction plate comprises a friction feature configured to interact with the plurality of protrusions and recesses to create a friction force that holds the accessory in the position. The accessory attachment system allows for movement of the accessory along the rail with an application of force. The applied force is greater than the friction force.

Embodiment 2 includes the features of embodiment 1, however the accessory is shaped to receive a portion of the mounting rail.

Embodiment 3 includes the features of any of embodiments 1-2, however movement of the accessory along the rail comprises movement substantially only along an axis parallel to a length of the rail.

Embodiment 4 includes the features of any of embodiments 1-3, however the accessory is coupled to a module shaped to receive a portion of the rail.

Embodiment 5 includes the features of embodiment 4, however the friction plate couples directly to the module.

Embodiment 6 includes the features of any of embodiments 1-5, wherein the friction plate is coupled to the accessory.

Embodiment 7 includes the features of embodiment 6, however the friction plate is coupled to the accessory by a fixing mechanism.

Embodiment 8 includes the features of embodiment 7, however the fixing mechanism is a screw.

Embodiment 9 includes the features of any of embodiments 1-8, wherein the friction plate is configured to temporarily deform.

Embodiment 10 includes the features of embodiment 9, however the temporary deformation is in a direction perpendicular to a length of the rail.

Embodiment 11 includes the features of embodiment 9, however the deformation direction is a first deformation direction and the friction plate is configured to temporarily deform along a second direction, and the second direction is parallel to a length of the rail. Embodiment 12 includes the features of any of embodiments 1-11, however the friction plate is flexible.

Embodiment 13 includes the features of any of embodiments 1-12, however the friction plate is metal.

Embodiment 14 includes the features of embodiment 13, however the friction plate is steel.

Embodiment 15 includes the features of embodiment 14, however the friction plate is AISI 301 steel.

Embodiment 16 includes the features of any of embodiments 1-15, however the friction plate comprises a polymer.

Embodiment 17 includes the features of any of embodiments 1-16, however the friction feature is "V-shaped."

Embodiment 18 includes the features of any of embodiments 1-17, however the friction feature is "U-shaped."

Embodiment 19 includes the features of any of embodiments 1-18, however the friction feature extends partly into a protrusion of the mounting rail.

Embodiment 20 includes the features of any of embodiments 1-19, and further includes a second friction feature.

Embodiment 21 includes the features of any of embodiments 1-20, however the mounting rail is a Picatinny type mounting rail system.

Embodiment 22 includes the features of any of embodiments 1-21, however the mounting rail is a Weaver type mounting rail system.

Embodiment 23 includes the features of any of embodiments 1-22, however the mounting rail is a Warsaw type mounting rail system.

Embodiment 24 includes the features of any of embodiments 1-23, however the mounting rail is a STANAG type mounting rail system.

Embodiment 25 is a friction plate for use with a rail system. The friction plate includes a fixing mechanism configured to couple the friction plate to an accessory. The friction plate includes a friction feature configured to engage a rail feature on the rail system. The friction feature engaging the rail feature generates a friction force. The friction plate is configured to allow the accessory to move along the rail system with the application of an applied force greater than the friction force. The movement is accomplished toollessly.

Embodiment 26 includes the features of embodiment 25, however the friction plate comprises a stiff material.

Embodiment 27 includes the features of any of embodiments 25-26, however the friction plate comprises metal.

Embodiment 28 includes the features of any of embodiments 25-27, however the friction plate comprises steel.

Embodiment 29 includes the features of any of embodiments 25-28, however the friction plate comprises a polymer.

Embodiment 30 includes the features of any of embodiments 25-29, however the friction plate comprises a fixing position configured to receive the fixing mechanism.

Embodiment 31 includes the features of embodiment 30, however the fixing mechanism comprises a mechanical fixing mechanism.

Embodiment 32 includes the features of embodiment 31, however the fixing mechanism comprises a screw configured to couple the friction plate to the accessory at the fixing position.

Embodiment 33 includes the features of any of embodiments 25-32, however the friction feature is configured to extend into, and be received by, the rail feature.

Embodiment 34 includes the features of embodiment 33, however the rail feature is a recess.

Embodiment 35 includes the features of any of embodiments 25-34, however the friction feature is V-shaped.

Embodiment 36 includes the features of any of embodiments 25-34, however the friction feature is U-shaped.

Embodiment 37 includes the features of any of embodiments 25-36, however engaging the rail feature causes temporary deformation of the friction feature.

Embodiment 38 includes the features of embodiment 37, however the temporary deformation is in a direction perpendicular to a length of the rail system.

Embodiment 39 includes the features of embodiment 38, however the temporary deformation is in a direction parallel to a length of the rail system.

Embodiment 40 includes the features of any of embodiments 25-39, and also a second friction feature.

Embodiment 41 includes the features of any of embodiments 25-40, however the friction plate is configured for use with a Picatinny rail system.

Embodiment 42 includes the features of any of embodiments 25-41, however the friction plate is configured for use with a Weaver rail system.

Embodiment 43 includes the features of any of embodiments 25-42, however the friction plate is configured for use with a Warsaw rail system.

Embodiment 44 includes the features of any of embodiments 25-43, however the friction plate is configured for use with a STANAG rail system.

Embodiment 45 is a method for attaching an accessory to a rail system. The method includes coupling a friction plate to the accessory. The method also includes aligning the accessory on the rail system. Aligning comprises causing the accessory to receive a portion of the rail system such that the accessory is limited to movement along an axis parallel to a length of the rail. Aligning the accessory on the rail system comprises a friction feature of the friction plate engaging a first rail feature of the rail system, generating a first friction force. The method also includes applying a force to the friction plate. The applied force is greater than the first friction force. Applying a force allows the accessory to move along the rail system. The method also includes positioning the accessory in a position on the rail system. Positioning the accessory comprises releasing the applied force. Releasing the applied force causes the friction feature to engage a second rail feature of the rail system, generating a second friction force.

Embodiment 46 includes the features of embodiment 45, however the second friction force is substantially the same as the first friction force.

Embodiment 47 includes the features of any of embodiments 45 or 46, however applying a force to the friction plate causes the friction plate to deform in a direction parallel to a length of the rail system.

Embodiment 48 includes the features of any of embodiments 45-47, however applying a force to the friction plate causes the friction plate to deform in a direction substantially perpendicular to a length of the rail system.

Embodiment 49 includes the features of any of embodiments 45-48, however coupling the friction plate to the accessory comprises coupling the friction plate to a module coupled to the accessory. The module is adapted to receive the friction plate. Aligning comprises the module receiving the portion of the rail system.

Embodiment 50 includes the features of any of embodiments 45-49, however coupling the friction plate to the accessory comprises a mechanical coupling.

Embodiment 51 includes the features of any of embodiments 45-50, however mechanical coupling comprises coupling the accessory to the friction plate at a fixing position using a fixing mechanism.

Embodiment 52 includes the features of embodiment 51, however the fixing mechanism is a screw.

Embodiment 53 includes the features of any of embodiments 45-52, however the method is accomplished toollessly.

Embodiment 54 includes the features of any of embodiments 45-53, however the applied force can be applied by a single user operating one-handed.

Embodiment 55 is a method for moving an accessory along a rail system. The method includes applying a force to the accessory. The accessory is coupled to a friction plate. The friction plate comprises a friction feature that engages a first rail feature of the rail system. When the friction feature engages the first rail feature, the friction plate is temporarily deformed, generating a first friction force. Applying the force to the accessory comprises applying a force greater than the first friction force. The applied force removes the temporary deformation from the friction plate and changes the engagement between the friction feature and the first rail feature such that the accessory can move along an axis parallel to a length of the rail system. The method also includes removing the applied force. Removing the applied force causes the friction plate to temporarily deform, and causing the friction feature to engage a second rail feature, generating a second friction force.

Embodiment 56 includes the features of embodiment 55, however the second friction force is substantially the same as the first friction force.

Embodiment 57 includes the features of any of embodiments 55-56, however the temporary deformation is a direction parallel to a length of the rail system.

Embodiment 58 includes the features of any of embodiments 55-57, however the temporary deformation is in a direction substantially perpendicular to a length of the rail system.

Embodiment 59 includes the features of any of embodiments 55-58, however the coupling between friction plate and the accessory is a mechanical coupling.

Embodiment 60 includes the features of embodiment 59, however mechanical coupling comprises coupling the accessory to the friction plate at a fixing position using a fixing mechanism.

Embodiment 61 includes the features of embodiment 60, however the fixing mechanism is a screw.

Embodiment 62 includes the features of any of embodiments 55-61, however the method is accomplished toollessly.

Embodiment 63 includes the features of any of embodiments 55-62, however the applied force can be applied by a single user operating one-handed.

Embodiment 64 includes the features of any of embodiments 1-18, however the friction feature extends completely into a protrusion of the mounting rail.

EXAMPLES

Various embodiments of the present disclosure can be better understood by reference to the following Examples which are offered by way of illustration. The present disclosure is not limited to the Examples given herein.

Force Measurement Test

The friction plates of Examples 1 and 2 were subjected to a force measurement test. A force measuring device (ILC-S 500N, Mecmesin, Värnamo Sweden) and displacement sensor (Multitest 2.5-i, Mecmesin, Värnamo Sweden) was used to create a force-displacement curve for the travel of the accessory mount from the locked to the unlocked position.

Example 1

An example friction plate accord to the present disclosure was fabricated and tested. A high yield strength spring steel sheet (stainless steel EN 1.4310, interchangable with AISI 301.) 0.3 mm thick was fashioned into the contour of FIGS. 3A-3C, with a bend radius of 1 mm and attached with screws to the underside of a Picatinny accessory mount. The total end-to-end length of the finished friction plate was 53.2 mm. The center-to-center distance between fixing points was 30.2 mm, and the total width at the fixing points was 35.4 mm. The width of the friction plate, at one of the friction features, was 16.2 mm. The depth of the friction feature was 1.7 mm.

The friction plate was fastened at both ends which prevents elastic deformation in the direction parallel to the rail. A spacing 338 between the plate and the accessory allows for elastic deformation in the direction perpendicular to the rail.

Figure 8A:
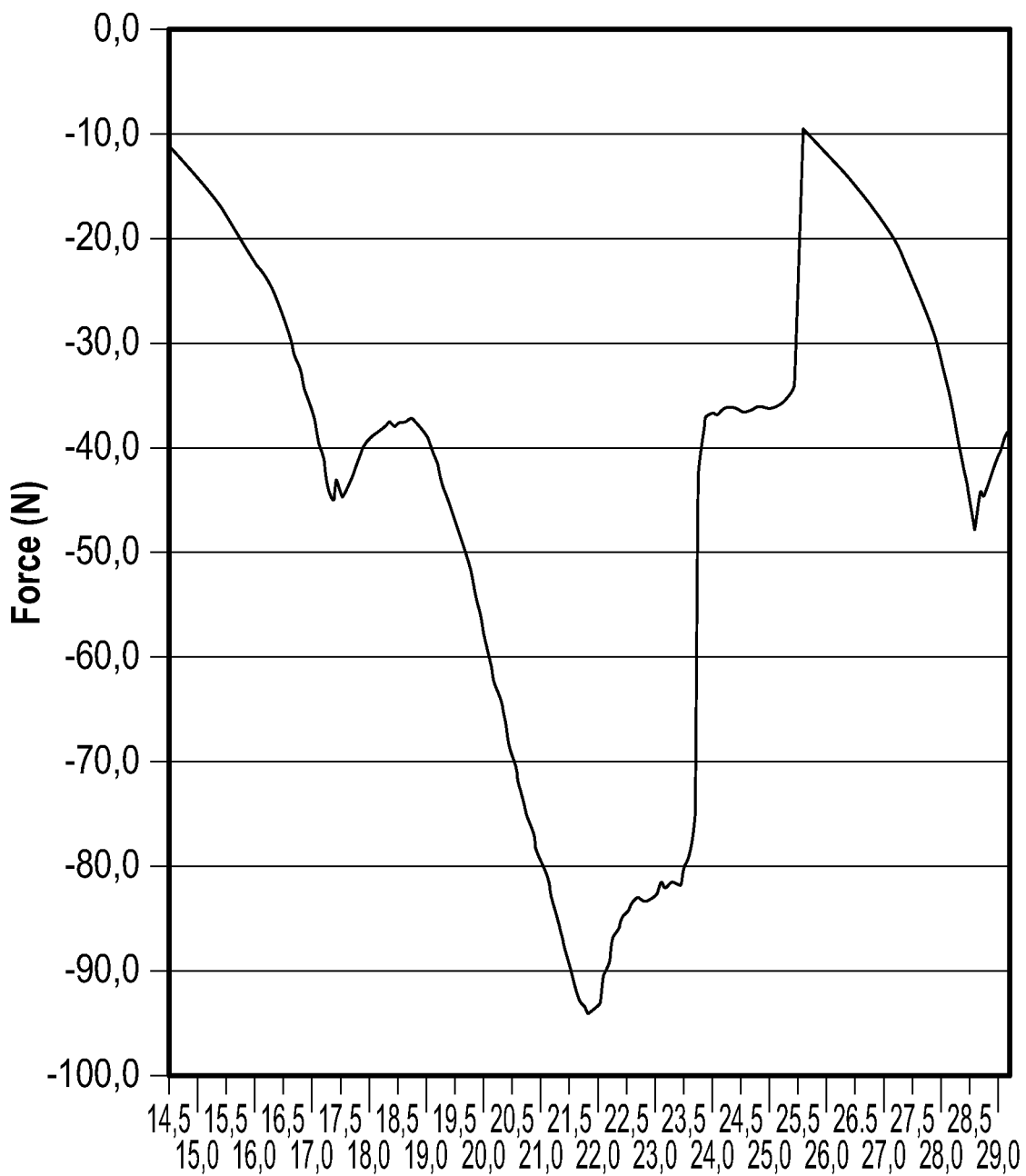
FIGS. 8A-8B illustrates actuating force curves for the embodiments illustrated in FIGS. 3 and 5.

A force measuring device and displacement sensor described above was used to create a force-displacement curve for the travel of the accessory mount from the locked to the unlocked position. The resulting curve, shown in FIG. 8A indicated a maximum unlocking force of 94N.

Various combinations of friction plate material and thickness, as well as contour and bend radius may be used to obtain different force-displacement curves.

Example 2

An example friction plate accord to the present disclosure was fabricated and tested. A high yield strength spring steel sheet (stainless steel EN 1.4310, interchangable with AISI 301) 0.3 mm thick was fashioned into the contour of FIGS. 5A-5C with a bend radius of 1 mm and attached with screws to the underside of a Picatinny accessory mount. The friction plate is fastened in one end which provides the ability for the plate to elastically deform both perpendicular and parallel to the rail. The total end-to-end length of the friction plate was 33.1 mm. The width of the friction plate at the fixing points was 35.4 mm, and the width at the friction feature was 16 mm. The depth of the friction feature, with respect to the fixing points, was 2.4 mm. The total height of the friction plate was 3.5 mm.

Figure 8B:
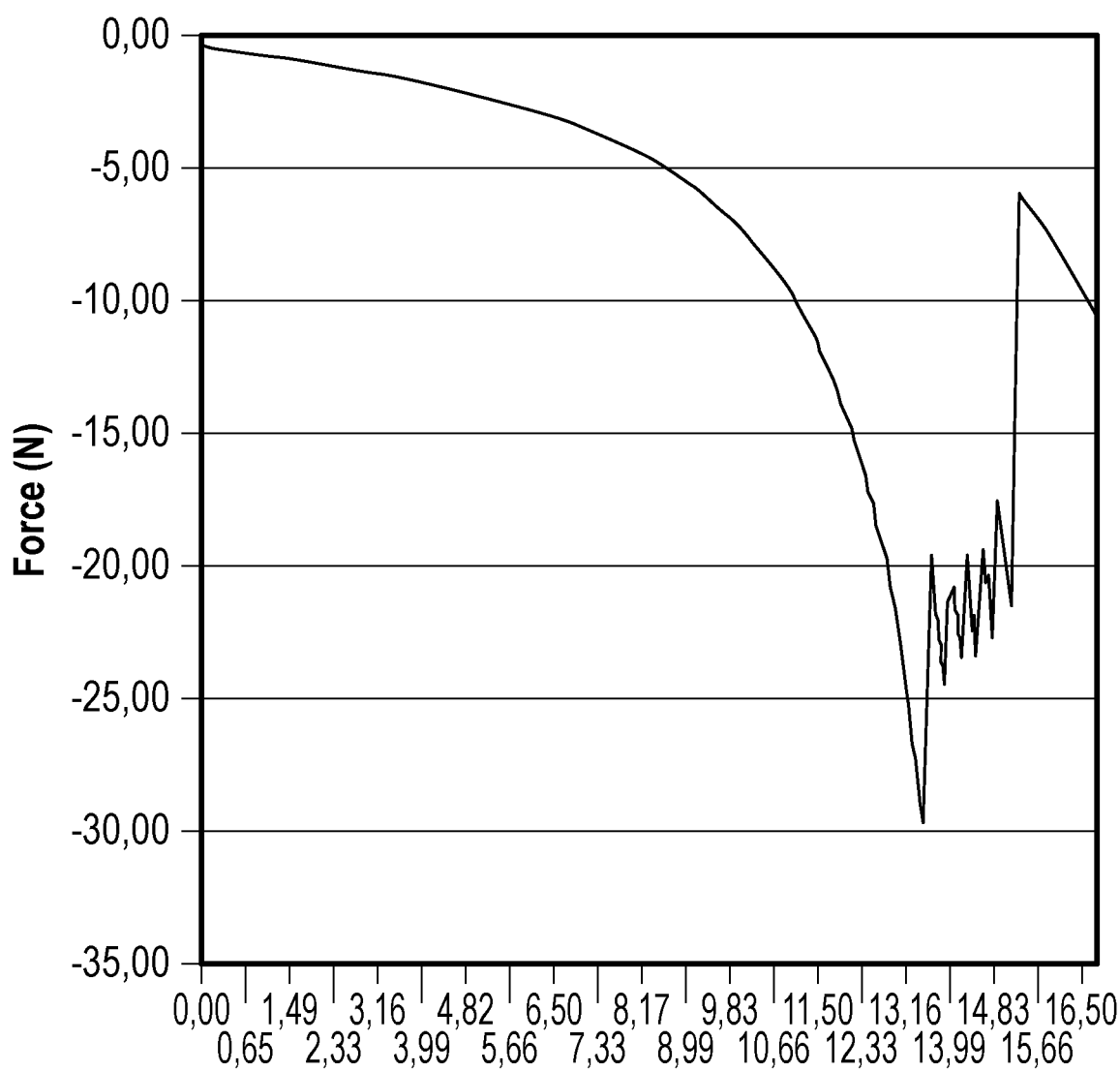

The force measuring device and displacement sensor described above were used to create a force-displacement curve for the travel of the accessory mount from the locked to the unlocked position. FIG. 8B shows the force required to displace the accessory with a peak force at 30 N.

Various combinations of friction plate material and thickness, as well as contour and bend radius may be used to obtain different force-displacement curves.

What is claimed is:

1. An accessory attachment system comprising:
   a mounting rail comprising a plurality of protrusions and recesses, wherein the protrusions and recesses alternate in a repeating pattern along the mounting rail;
   an accessory configured to be mounted on the mounting rail;
   a friction plate configured to hold the accessory in a position on the mounting rail, wherein the friction plate comprises a friction feature configured to interact with the plurality of protrusions and recesses to create a friction force that holds the accessory in the position, wherein the friction feature is configured to cause a deflection of the friction plate in a deflection direction when interacting with the plurality of protrusions and recesses, wherein the friction plate and the friction feature are formed from the same piece in a unitary construction, wherein the friction plate is configured to temporarily deform, wherein the friction force is created by the interaction of friction features with the plurality of protrusions and recesses of the mounting rail; and
   wherein the accessory attachment system allows for movement of the accessory along the rail with an application of force, wherein the applied force is greater than the friction force.

2. The accessory attachment system of claim 1, wherein the accessory is shaped to receive a portion of the mounting rail.

3. The accessory attachment system of claim 1, wherein movement of the accessory along the rail comprises movement substantially only along an axis parallel to a length of the rail.

4. The accessory attachment system of claim 1, wherein the temporary deformation is in a direction perpendicular to a length of the rail.

5. The accessory attachment system of claim 1, wherein the friction feature is "V-shaped" or "U-shaped".

6. The accessory attachment system of claim 1, wherein the friction feature extends partly into a protrusion of the mounting rail.

7. The accessory attachment system of claim 1, and further comprising a second friction feature.

8. The accessory attachment system of claim 1, wherein the friction plate is made of spring steel.

9. The accessory attachment system of claim 1, wherein the friction plate is a uniform thickness throughout.

10. The accessory attachment system of claim 1, wherein the friction plate is bent and contoured to form the friction feature.

11. The accessory attachment system of claim 1, wherein the wherein the friction plate is attached to the accessory at more than 2 corners of the friction plate.

12. A method for attaching an accessory to a rail system, the method comprising:
    providing an accessory attachment system, comprising:
        a mounting rail comprising a plurality of protrusions and recesses, wherein the protrusions and recesses alternate in a repeating pattern along the mounting rail;
        a friction plate configured to hold the accessory in a position on the mounting rail, wherein the friction plate comprises a friction feature configured to interact with the plurality of protrusions and recesses to create a friction force that holds the accessory in the position, wherein the friction feature is configured to cause a deflection of the friction plate in a deflection direction when interacting with the plurality of protrusions and recesses, wherein the friction plate and the friction feature are formed from the same piece in a unitary construction, wherein the friction plate is configured to temporarily deform, wherein the friction force is created by the interaction of friction features with the plurality of protrusions and recesses of the mounting rail; and
        wherein the accessory attachment system allows for movement of the accessory along the rail system with an application of force, wherein the applied force is greater than the friction force;
    coupling the friction plate to the accessory;
    aligning the accessory on the rail system, wherein aligning comprises causing the accessory to receive a portion of the rail system such that the accessory is limited to movement along an axis parallel to a length of the rail, and wherein aligning the accessory on the rail system comprises a friction feature of the friction plate engaging a first rail feature of the rail system, generating a first friction force, wherein the friction feature causes a deflection of the friction plate in a deflection direction when the friction feature engages the first rail feature of the rail system;
    applying a force to the friction plate, wherein the applied force is greater than the first friction force, and wherein applying a force allows the accessory to move along the rail system; and
    positioning the accessory in a position on the rail system, wherein positioning the accessory comprises releasing the applied force, and wherein releasing the applied force causes the friction feature to engage a second rail feature of the rail system, generating a second friction force.

13. The method of claim 12, wherein the second friction force is substantially the same as the first friction force.

14. The method of claim 12, wherein coupling the friction plate to the accessory comprises coupling the friction plate to a module coupled to the accessory, wherein the module is adapted to receive the friction plate and wherein aligning comprises the module receiving the portion of the rail system.

15. The method of claim 12, wherein coupling the friction plate to the accessory comprises a mechanical coupling.

16. The method of claim 12, wherein the method is accomplished toollessly.

17. The method of claim 12, wherein the applied force can be applied by a single user operating one-handed.

* * * * *